United States Patent
Wang

(10) Patent No.: US 9,838,293 B2
(45) Date of Patent: Dec. 5, 2017

(54) THROUGHPUT TEST METHOD AND APPARATUS

(71) Applicant: ZTE CORPORATION, Shenzhen, Guangdong Province (CN)

(72) Inventor: Yu Wang, Shenzhen (CN)

(73) Assignee: XI'AN ZHONGXING NEW SOFTWARE CO., LTD., Xi'An, Shaanxi (CN)

( * ) Notice: Subject to any disclaimer, the term of this patent is extended or adjusted under 35 U.S.C. 154(b) by 56 days.

(21) Appl. No.: 14/441,868

(22) PCT Filed: Jul. 16, 2013

(86) PCT No.: PCT/CN2013/079445
§ 371 (c)(1),
(2) Date: May 11, 2015

(87) PCT Pub. No.: WO2013/182137
PCT Pub. Date: Dec. 12, 2013

(65) Prior Publication Data
US 2015/0295810 A1    Oct. 15, 2015

(30) Foreign Application Priority Data
Sep. 26, 2012 (CN) .......................... 2012 1 0363740

(51) Int. Cl.
H04L 12/26      (2006.01)
H04L 1/24       (2006.01)
H04L 12/815     (2013.01)

(52) U.S. Cl.
CPC .............. *H04L 43/50* (2013.01); *H04L 1/243* (2013.01); *H04L 43/0888* (2013.01); *H04L 43/10* (2013.01); *H04L 47/22* (2013.01)

(58) Field of Classification Search
None
See application file for complete search history.

(56) References Cited

U.S. PATENT DOCUMENTS 6,067,297 A * 5/2000 Beach ................... H04W 88/08
                                                           370/311
6,990,616 B1 * 1/2006 Botton-Dascal .... H04L 12/2697
                                                           709/238
(Continued)

FOREIGN PATENT DOCUMENTS

CN          201001129 Y      1/2008
CN          101656635 A      2/2010
(Continued)

OTHER PUBLICATIONS

XP002678590; Cisco IOS Software Release 12.2(33)SXI, New Features and Hardware Support; Jul. 2009.

*Primary Examiner* — Gregory Sefcheck
(74) *Attorney, Agent, or Firm* — Ling Wu; Stephen Yang; Ling and Yang Intellectual Property

(57) ABSTRACT

Disclosed are a throughput test method and apparatus. The method includes: a first network device generating a periodic detection message through a data processor; the first network device sending the detection message to a second network device to be tested, wherein a first throughput value of the first network device is greater than or equal to a second throughput value of the second network device; the first network device receiving a loopback detection message looped back by the second network device; the first network device obtaining a first quantity value of the detection messages as well as a second quantity value of the loopback detection messages; and the first network device obtaining the second throughput value characterizing the throughput of the second network device through the data processor based on the first quantity value and the second quantity value.

13 Claims, 5 Drawing Sheets

(56) References Cited

U.S. PATENT DOCUMENTS

| | | | |
|---|---|---|---|
| 7,009,957 B2* | 3/2006 | Wu | H04L 12/2697 370/338 |
| 7,058,723 B2* | 6/2006 | Wilson | H04L 47/10 370/229 |
| 7,292,562 B2* | 11/2007 | Wu | H04L 12/2697 370/338 |
| 7,305,464 B2* | 12/2007 | Phillipi | H04L 12/2697 709/223 |
| 7,729,265 B2* | 6/2010 | Kanno | H04L 12/2697 370/242 |
| 7,945,888 B2* | 5/2011 | Adir | G06F 17/5022 703/20 |
| 7,970,394 B2* | 6/2011 | Behroozi | H04L 43/50 455/423 |
| 8,233,399 B2* | 7/2012 | Olderdissen | H04L 12/2697 370/241 |
| 8,248,948 B2* | 8/2012 | Weil | H04L 12/2697 370/237 |
| 8,311,776 B2* | 11/2012 | Blackledge | H04L 43/0888 324/762.01 |
| 8,582,458 B2* | 11/2013 | Robbins | H04L 12/2697 370/241 |
| 8,792,382 B2* | 7/2014 | Bugenhagen | H04L 41/5009 370/253 |
| 9,462,485 B2* | 10/2016 | Russell | H04W 24/06 |
| 2003/0161341 A1* | 8/2003 | Wu | H04L 12/2697 370/448 |
| 2006/0068839 A1* | 3/2006 | Kim | H04L 41/0253 455/552.1 |
| 2010/0050028 A1 | 2/2010 | Kuo | |

FOREIGN PATENT DOCUMENTS

| | | |
|---|---|---|
| CN | 101848223 A | 9/2010 |
| CN | 102104502 A | 6/2011 |
| CN | 102904772 A | 1/2013 |

* cited by examiner

THROUGHPUT TEST METHOD AND APPARATUS

TECHNICAL FIELD

The present document relates to the field of data transmission, and more particularly, to a throughput test method and apparatus.

BACKGROUND OF THE RELATED ART

Throughput refers to the maximum transmission rate at which a network device sends and receives frames under the condition that there is no frame loss. It is one of the most important indicators reflecting the performance of a network device. The value of a network device's throughput will be different when the network device is in a different operating modes or different environments. Generally, we respectively perform a bi-directional throughput test for data frames with the sizes of 64, 128, 256, 512, 1024, 1280 and 1518 bytes during the test, to obtain the maximum transmission rate under the condition that there is no frame loss. Throughput is generally indicated in two ways, one is using percentage ($TP_\%$) for indicating, and the other one is using frames/sec ($TP_{pps}$) for indicating, and the representations of these two throughputs can be mutually converted through the following formula:

$$B_{bps} \times TP_\% = TP_{pps} \times (L_f + L_c)$$

wherein $B_{bps}$ on the left side of the formula is the theoretical bandwidth (Unit: bits/sec) of the network device; $TP_\%$ is the percentage of the throughput; and $B_{bps} \times TP_\%$ represents the total number of bits that the network device can transmit within one second; $TP_{pps}$ on the right side of the formula is the value of the throughput in frames/second; $L_f$ is the length (Unit: bits) of the Ethernet data frame used in the current test; $L_c$ is a constant 160 (Unit: bits), because the front of each Ethernet frame has an extra overhead of 160 bits, that is, 8 bytes of preamble plus 12 bytes of inter-frame space; and ($L_f + L_c$) indicates the number of bits actually transmitted in the Ethernet data frame.

In the related art, professional testers are used to test the throughput of a network device to be tested, for example, using the tester Smartbits to test the throughput of a network device to be tested by using the dichotomy approximation method comprises the following steps:

step (1), the Smartbits device creates the Ethernet data frame flow F, and the length of a data frame is defined as 64 bytes, the size of the flow F is initialized as the theoretical throughput value $TP_{pps}$ of the network device, namely, the $TP_\%$ corresponding to the $TP_{pps}$ equals 100%.

Step (2), the Smartbits device starts sending the Ethernet data frame flow F from the sending port A to the receiving port B of the network device.

Step (3), after receiving the flow F from the receiving port B, the network device processes and then sends the flow F from the sending port C to the receiving port D of the Smartbits device.

Step (4), the Smartbits device receives the Ethernet data frame flow F from the receiving port D.

Step (5), after the time period of $T_s$ (such as 1 minute), the Smartbits device stops sending the Ethernet data frame flow F and analyzes the statistics of the received and sent frames, and the specific analysis is described as follows:

(a) if no frame loss occurs when $TP_\%=100\%$, the throughput test is completed, and the throughput of the network device is 100%;

(b) if a frame loss occurs when $TP_\%=100\%$, it is to decrease the flow rate $TP_\%$ from 100% to 50%, then proceed to step (2) to retest.

(c) if no frame loss occurs when $TP_\%=50\%$, it is to increase the flow rate $TP_\%$ from 50% to 75%, then proceed to step (2) to retest;

(d) if a frame loss still occurs when $TP_\%=50\%$, it is to decrease the flow rate $TP_\%$ from 50% to 25%, then proceed to step (2) to retest. (6) after repeating the test for several times, eventually an accurate throughput

SUMMARY OF THE INVENTION

However, the research by the inventors of the present application found that the abovementioned technology at least has the following technical problems:

since the network device cannot perform an automatic test for throughput, and a professional tester has to be used, there exists the technical problem that the throughput test cannot be carried out in the absence of a test instrument or the test instrument cannot work;

In addition, since an extra test instrument is needed, the costs of throughput test also increase.

The embodiment of the present invention provides a throughput test method, to solve the technical problem in the related art that the throughput test cannot be carried out in the absence of a test instrument or the test instrument cannot work, so as to achieve the technical effect of using a network device to automatically test the throughput.

The embodiment of the present invention provides a throughput test method, comprising:

a first network device generating a periodic detection message through a data processor;

the first network device sending the detection message to a second network device to be tested, wherein a first throughput value of the first network device is greater than or equal to a second throughput value of the second network device;

the first network device receiving a loopback detection message looped back by the second network device;

the first network device obtaining a first quantity value of the detection messages, as well as a second quantity value of the loopback detection messages; and the first network device obtaining a second throughput value characterizing a throughput of the second network device through the data processor based on the first setting S to 0, wherein the S is the first quantity value characterizing the detection messages;

setting R to 0, wherein the R is the second quantity value characterizing the loopback detection messages;

setting $C_{LP}$ to C, wherein the value of C is obtained based on the formula $B_{bps} \times TP_\% / (L_f + L_c) \times T_s$, wherein $B_{bps}$ characterizes the theoretical broadband of the second network device, $TP_\%$ characterizes the percentage of the throughput of the second network device, $L_f + L_c$ characterizes the actual transmission value of data frames, and $C_{LP}$ is a third quantity value characterizing the remaining detection messages needing to be sent in this test process; and setting a timer $T_{CPU}$ to $T_s$ seconds, wherein the timer $T_{CPU}$ is configured to control the data processor to generate a periodic detection message.

Alternatively, the step of the first network device generating a periodic detection message through the data processor and sending the detection message to the second network device to be tested comprises:

obtain a template message, through the data processor, created by a template message creation module in the first network device;

based on the template message, generating the periodic detection message through the data processor;

perform a traffic shaping on the detection message through the data processor, so that when the network is congested, making the first network device send the detection message at a constant rate; and;

sending the traffic shaped detection message to the second network device to be tested.

Alternatively, the step of sending the traffic shaped detection message to the second network device to be tested comprises:

the first network device sending C detection messages to the second network device, wherein C is an integer greater than or equal to 1, and $C_{LP}=C$;

after each time when the detection message is sent, the first quantity value S characterizing the detection messages being added by 1; when S=C, stopping sending the detection message.

Alternatively, the step of generating the periodic detection message through the data processor based on the template message comprises:

detecting whether there is an interrupt event occurring or not through the data processor;

when there is an interrupt event occurring, generating the periodic detection message through the data processor based on the template message;

wherein the interrupt rate value of the interrupt event occurring is greater than or equal to the second throughput value characterizing the throughput of the second network device.

Alternatively, the loopback detection message is:

a message sent via a sending/receiving port of the second network device to the first network device after the second network device receives and processes the detection message.

Alternatively, after the step of the first network device receiving a loopback detection message looped back by the second network device, the method further comprises:

processing the loopback detection message; judging validity of the loopback detection message; and when the loopback detection message is valid, adding the second quantity value R characterizing the loopback detection messages by 1.

Alternatively, the step of the first network device obtaining the second throughput value characterizing the throughput of the second network device through the data processor based on the first quantity value and the second quantity value comprises:

when the counting time of a timer in the first network device is greater than is equal to preset time, comparing the first quantity value with the second quantity value to obtain a comparison result;

when the comparison result shows that the first quantity value is equal to the second quantity value, determining the test throughput value obtained when the first quantity value is equal to the second quantity value as the second throughput value, wherein the second throughput value is the second network device's real throughput value.

The embodiment of the present invention further provides a network device, comprising: a sending/receiving port, a template message creation module and a data processor connected to the sending/receiving port, wherein the template message creation module is configured to: create a template message;

the data processor is configured to: generate a periodic detection message based on the template message; send the detection message to a second network device to be tested through the sending/receiving port, wherein a first throughput value of the network device is greater than or equal to a second throughput value of the second network device; receive a loopback detection message looped back by the second network device through the sending/receiving port, and obtain a first quantity value of the detection messages, as well as a second quantity value of the loopback detection messages; and obtain the second throughput value characterizing the throughput of the second network device by using the data processor based on the first quantity value and the second quantity value.

Alternatively, a first network protocol supported by the network device and a second network protocol supported by the second network device are the same network protocol.

Alternatively, the network device further comprises an initialization setting unit, configured to: perform an initialization setting on system resources of the network device.

Alternatively, the initialization setting unit comprises:

a first setting unit, configured to: set S to 0, wherein the S is the first quantity value characterizing the detection messages;

a second setting unit, configured to: set R to 0, wherein the R is the second quantity value characterizing the loopback detection messages;

a third setting unit, configured to: set $C_{LP}$ to C, wherein the value of C is obtained based on the formula $B_{bps} \times TP_{\%}/(L_f+L_c) \times T_s$, wherein C is an integer greater than or equal to 1, $B_{bps}$ characterizes the theoretical broadband of the second network device, $TP_{\%}$ characterizes the percentage of the throughput of the second network device, $L_f+L_c$ characterizes the actual transmission value of data frames, and $C_{LP}$ is a third quantity value characterizing the remaining detection messages needing to be sent in this test process; and a fourth setting unit, configured to: set the timer $T_{CPU}$ to $T_s$ seconds, wherein the timer $T_{CPU}$ is configured to control the data processor to generate a periodic detection message.

Alternatively, the data processor comprises:

a detection message generation unit, configured to generate the periodic detection message through the data processor based on the template message;

a shaping unit, configured to: perform traffic shaping on the detection message through the data processor.

Alternatively, the detection message generation unit comprises:

an interrupt detection unit, configured to: detect whether there is an interrupt event occurring or not;

a generation unit, configured to: when there is an interrupt event occurring, generate the periodic detection message through the data processor based on the template message;

wherein the interrupt rate value of the interrupt event occurring is greater than or equal to the second throughput value characterizing the throughput of the second network device.

Alternatively, the data processor further comprises:

a comparison unit, configured to: when the counting time of a timer in the network device is greater than or equal to preset time, compare the first quantity value with the second quantity value to obtain a comparison result;

a determination unit, configured to: when the comparison result shows that the first quantity value is equal to the second quantity value, determine the test throughput value obtained when the first quantity value is equal to the second quantity value as the second throughput value, wherein the second throughput value is the second network device's real throughput value.

One or more technical solutions provided in the embodiment of the present invention at least have the following technical effects or advantages:

(1) since the technical means of using a network device to simulate a professional tester is used, it solves the technical problem that the throughput test cannot be carried out in the absence of a test instrument or the test instrument cannot work, and it further has the technical effect of using the network device to automatically test the throughput.

(2) At the same time, it solves the problem that an extra professional test instrument is needed, and it further has the technical effect of reducing the costs of throughput test.

PREFERRED EMBODIMENTS OF THE INVENTION

Hereinafter in conjunction with the accompanying drawings, the embodiments of the present invention will be described in detail. It should be noted that in the case of no conflict, embodiments of the present application and features in the embodiments may be arbitrarily combined with each other.

The embodiment of the present invention provides a throughput test method, to solve the technical problem in the related art that the throughput test cannot be carried out in the absence of a test instrument or the test instrument cannot work, so as to achieve the technical effect of using a network device to automatically test the throughput.

In the embodiment of the present invention, the process of using a first network device having a data processor in the communication network to implement a throughout test comprises:

the first network device generating a periodic detection message through the data processor;

the first network device sending the detection message to a second network device to be tested, wherein a first throughput value of the first network device is greater than or equal to a second throughput value of the second network device;

the first network device receiving a loopback detection message looped back by the second network device;

the first network device obtaining a first quantity value of the detection messages, as well as a second quantity value of the loopback detection messages; and the first network device obtaining the second throughput value characterizing a throughput of the second network device through the data processor based on the first quantity value and the second quantity value.

It can be seen that based on the scheme of the embodiment of the present invention, the technical problem in the related art, that the throughput test cannot be carried out in the absence of a test instrument or the test instrument cannot work, can be effectively solved, so as to achieve the technical effect of using a network device to automatically test the throughput.

Hereinafter in conjunction with the accompanying drawings and specific embodiments, the abovementioned technical scheme will be described in detail.

The throughput test method in the embodiment of the present invention is applied to a first network device in a communication network, and the throughput of a second network device to be tested can be tested in the communication network through the first network device.

The first network device may be a variety of network devices such as switches in the communication network, in the embodiment of the present invention, and the applicants will not limit the types of the first network device, but the first network device should have the data processing function and support the same network protocol as the second network device.

Figure 1:
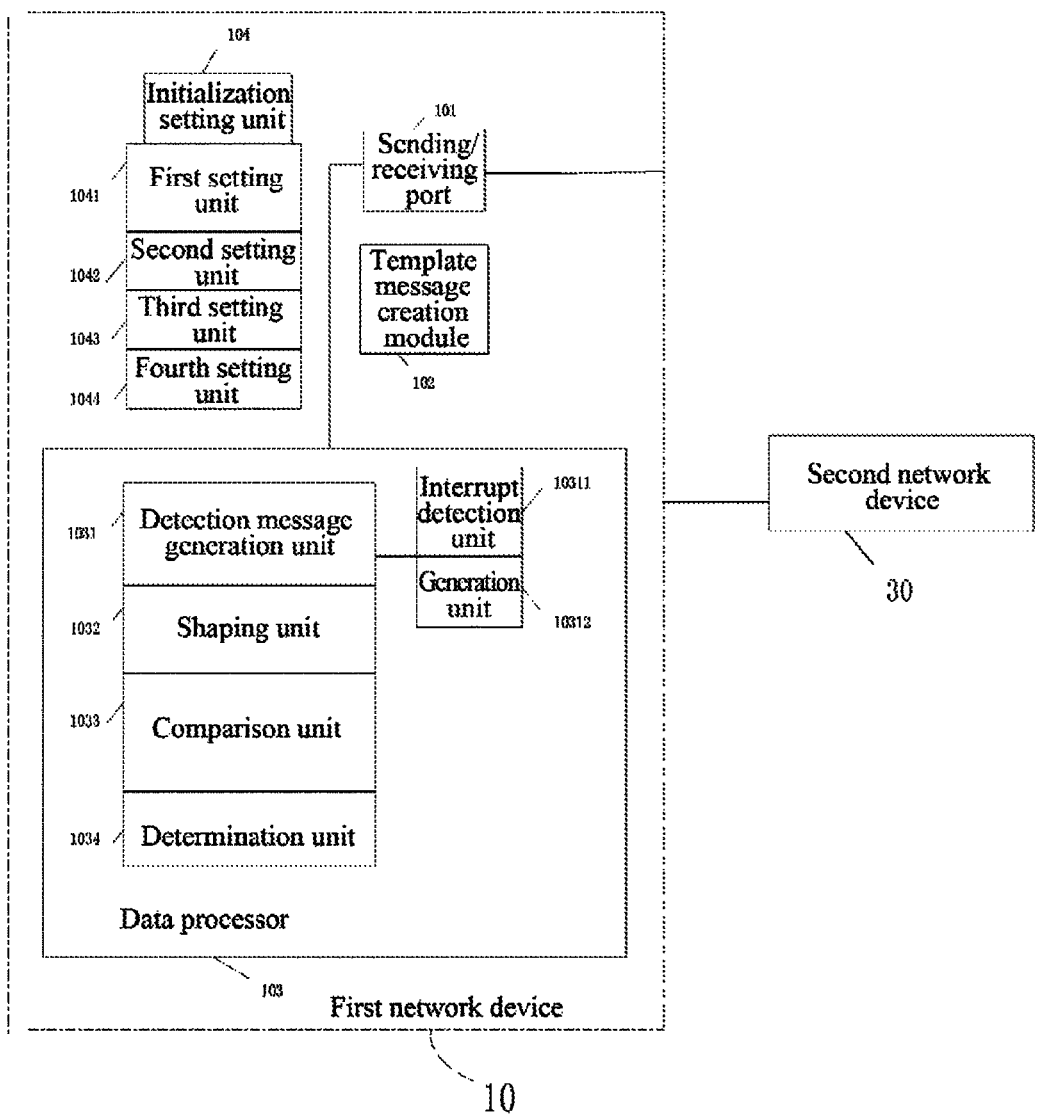
FIG. 1 is a structural diagram of modules of a first network device in accordance with an embodiment of the present invention.

FIG. 1 is a structural diagram of modules of the first network device in accordance with an embodiment of the present invention. Refer to FIG. 1, the first network device 10 applied in the throughput test method in the embodiment of the present invention comprises:

a sending/receiving port 101,
a template message creation module 102,
a data processor 103 connected to the sending/receiving port 101, wherein the template message creation module 102 is configured to: create a template message;

the data processor 103 is configured to: generate a periodic detection message based on the template message; send the detection message via the sending/receiving port 101 to the second network device 30 to be tested, wherein the first throughput value of the first network device 10 is greater than or equal to the second throughput value of the second network device 30; receive the loopback detection message looped back by the second network device 30 through the sending/receiving port 101, and obtain a first quantity value of the detection messages, as well as a second quantity value of the loopback detection messages; and obtain the second throughput value characterizing the throughput of the second network device 30 through the data processor 103 based on the first quantity value and the second quantity value.

Figure 2:
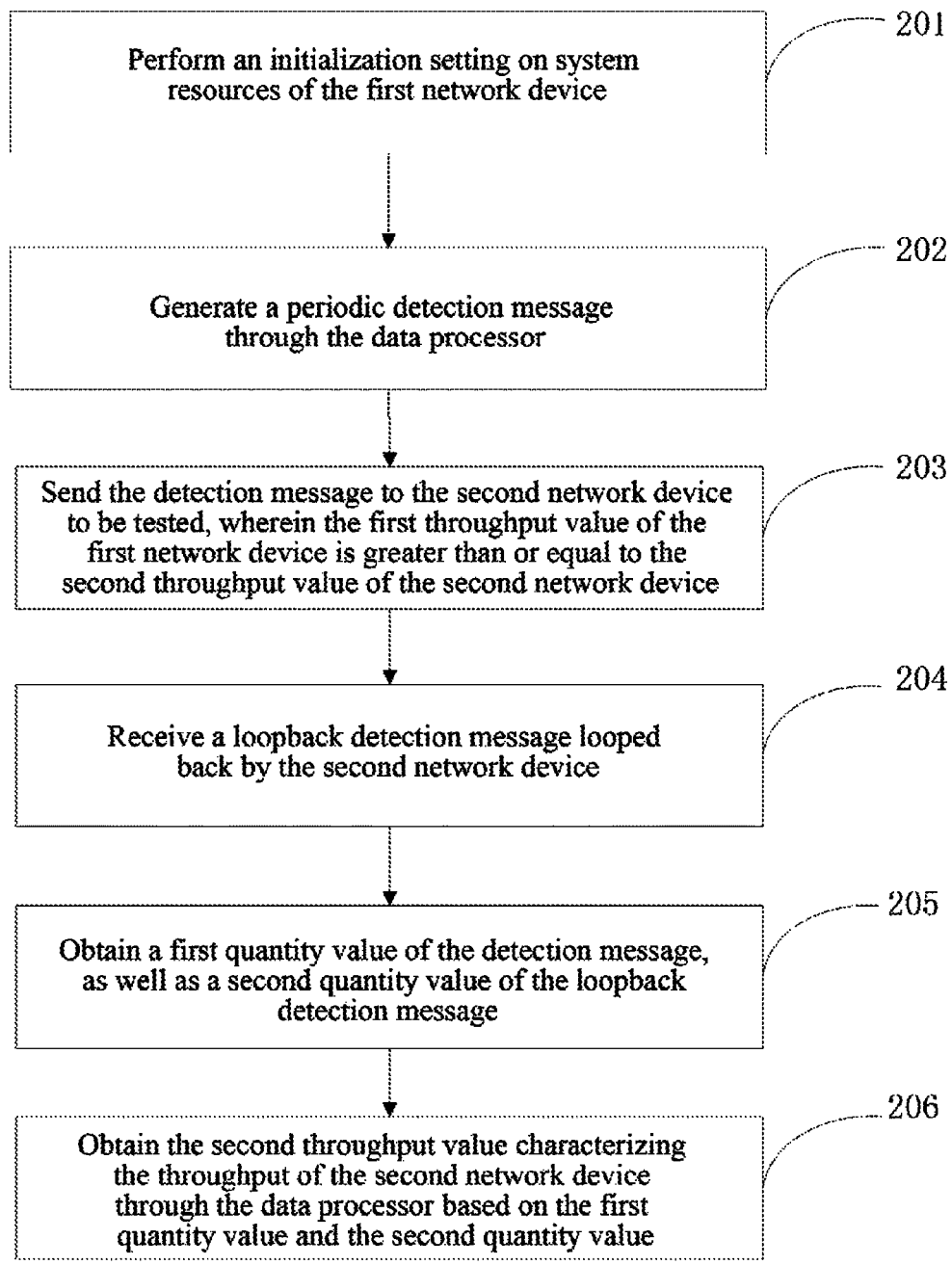
FIG. 2 is a flow chart of a throughput test method in accordance with an embodiment of the present invention.

Hereinafter, combining FIG. 1 and FIG. 2, the throughput test method in the embodiment of the present invention will be described in detail. FIG. 2 is a flow chart of the throughput test method in the embodiment of the present invention, and as shown in FIG. 2, it comprises the following steps.

In step 201, it is to perform an initialization setting on system resources of the first network device 10.

Figure 3:
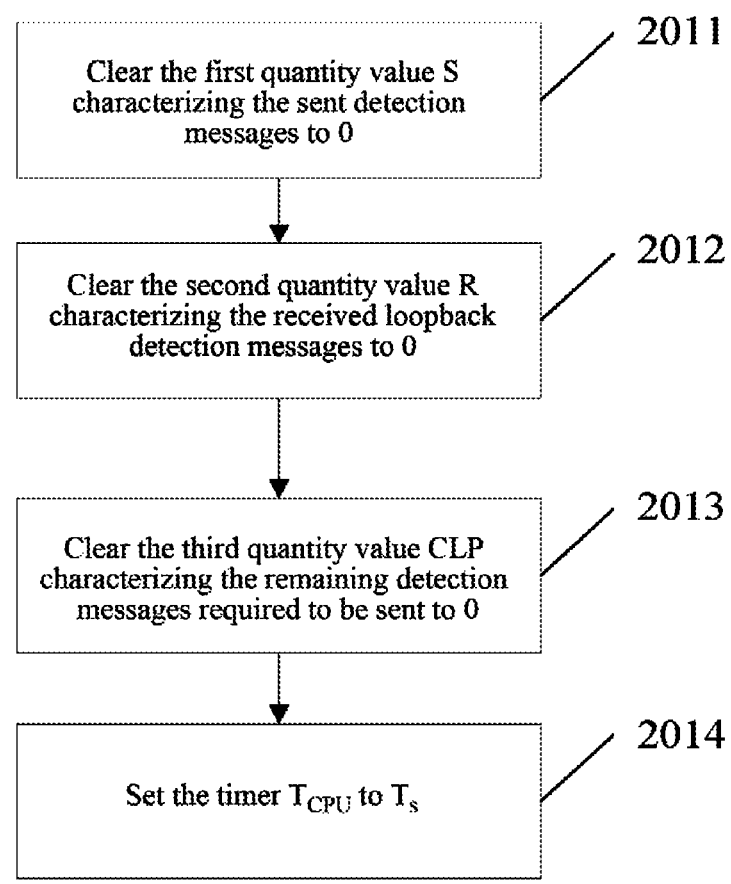
FIG. 3 is a flow chart of performing an initialization setting on system resources of the first network device in accordance with an embodiment of the present invention.

Alternatively, the implementation process of step 201 is shown in FIG. 3, and comprises the following steps.

In step 2011, it is to set S to 0, wherein the S is the first quantity value characterizing the detection messages.

In step 2012, it is to set R to 0, wherein the R is the second quantity value characterizing the loopback detection messages.

In step 2013, it is to set $C_{LP}$ to C, wherein the value of C is obtained based on the formula $B_{bps} \times TP_\% / (L_f + L_c) \times T_s$, herein it needs to assume a value of $TP_\%$, and this value is the throughout value of the second network device in this test, wherein $B_{bps}$ characterizes the theoretical broadband of the second network device, $TP_{\%}$ characterizes the percentage of the throughput of the second network device, $L_f+L_c$ characterizes the actual transmission value of data frames, and $C_{LP}$ is a third quantity value characterizing the remaining detection messages needing to be sent in this test process.

In step 2014, it is to set the timer $T_{CPU}$ to $T_s$ seconds, wherein $T_s$ is a preset time value, wherein the timer $T_{CPU}$ is configured to control the data processor to generate a periodic detection message.

After finishing initializing the system resources of the first network device 10 via the step 201, the method in the embodiment of the present invention proceeds to step 202.

In step 202, it is to generate a periodic detection message through the data processor 103.

In the implementation process, the step 202 comprises:
creating a template message; generating a periodic detection message through the data processor 103 based on the template message;

In the implementation process, the step of creating a template message can be achieved through software programming, wherein the programming language can be JAVA or C++; of course, one of ordinary persons skilled in the art can also create the template message in the way of hardware.

In the implementation process, the step of generating the periodic detection message through the data processor 103 based on the template message comprises:
detecting whether there an interrupt event occurring or not;
when there is an interrupt event occurring, generating the periodic detection message through the data processor 103 based on the template message; wherein the interrupt rate value of the interrupt event occurring is greater than or equal to the second throughput value characterizing the throughput of the second network device 30.

In the implementation process, before detecting whether there is an interrupt event occurring or not, an interrupt rate value can be preset, and the interrupt rate value is greater than or equal to the throughput value of the second network device 30 to be tested.

Figure 4:
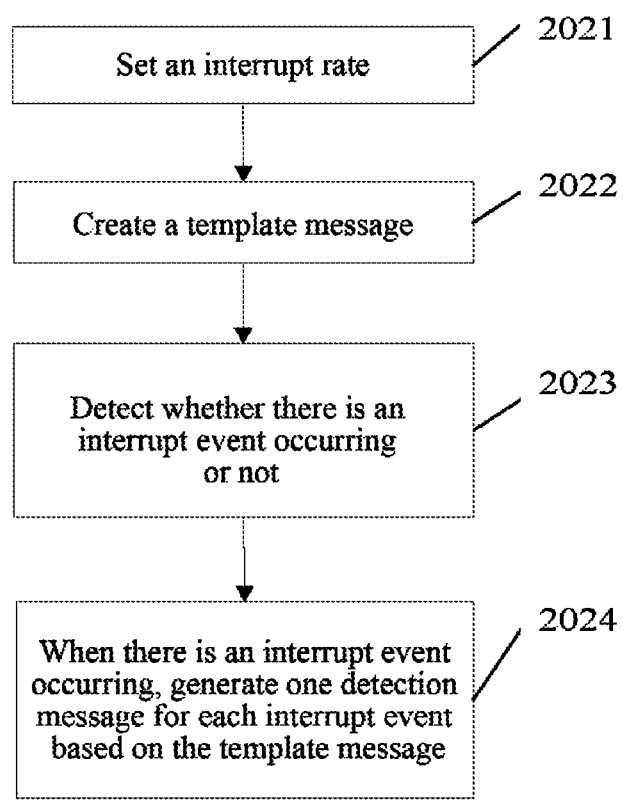
FIG. 4 is a flow chart of the first network device generating a periodic detection message in accordance with an embodiment of the present invention.

To make those skilled in the art more clearly understand the implementation process of the step 202, the implementation process of the step 202 will be described in detail with combination of FIG. 4. As shown in FIG. 4, it comprises the following steps.

In step 2021, it is to set an interrupt rate.
In step 2022, it is to create a template message.
In step 2023 it is to detect whether there is an interrupt event occurring or not.
In step 2024, when there is an interrupt event occurring, it is to generate a detection message for each interrupt event based on the template message.

The detection message can be a LBM (LoopBack Message) based on the OAM (Operation Administration and Maintenance) protocol, and at this time, the loopback detection message corresponding to the LBM is a LBR (LoopBack Reply) message.

The detection message can also be a message supported by other network protocols supported by the first network device 10 and the second network device 30 to be tested, and herein the types of the message are not limited, and as long as the types of message are included in the network protocols jointly supported by the first network device 10 and the second network device 30, they are within the scope of the detection message in the present document.

After performing the step 202, the method in the embodiment of the present invention proceeds to step 203.

In step 203, it is to send the detection message to the second network device 30 to be tested, wherein the first throughput value of the first network device 10 is greater than or equal to the second throughput value of the second network device 30.

In the implementation process, the step 203 comprises:
performing traffic shaping on the detection message through the data processor 103;
sending the traffic-shaped detection message to the second network device 30 to be tested.

The traffic shaping is needed herein in order to ensure that when the network is congested, the first network device 10 can send the detection message at a constant rate.

In the implementation process, in order to ensure that the traffic sent by the first device 10 to the second network device 30 to be tested is uniform and prevent a burst of flow from affecting the final test result, the implementation way of traffic shaping can be setting a maximum transmission rate $r_m$ at the sending/receiving port 101 of the first network device 10, and when the traffic at the sending/receiving port 101 of the first network device 10 is greater than $r_m$, the traffic which is unable to be immediately sent at the sending/receiving port 101 will be temporarily cached, then the traffic will continue to be sent at the rate of $r_m$, therefore there is not a burst of heavy flow occurring at the sending/receiving port 101 of the first network device 10, which can effectively guarantee that the second network device 30 will not have network congestion.

The shaping function may be a traffic shaping function configured on a dedicated loopback interface of a network processor or switch chip having the data processing function.

In the embodiment of the present invention, when performing the step 203, the first network device 10 sends C detection messages to the second network device 30 to be tested, wherein the value of C is determined in the initialization setting and obtained according to the formula $B_{bps} \times TP_{\%}/(L_f+L_c) \times T_s$, wherein $TP_{\%}$ is the preset throughout value of the second network device 30 to be tested in this test; and C is a positive integer greater than or equal to 1.

After each time when the first network device 10 sends the detection message to the second network device 30 to be tested, the value of S which is used to count the number of sent detection messages is added by 1, while the value of $C_{LP}$ which is used to count the number of remaining detection messages to be sent is subtracted by 1, and when $C_{LP}=S$, the first network device 10 stops sending the detection message to the second network device 30.

Figure 5:
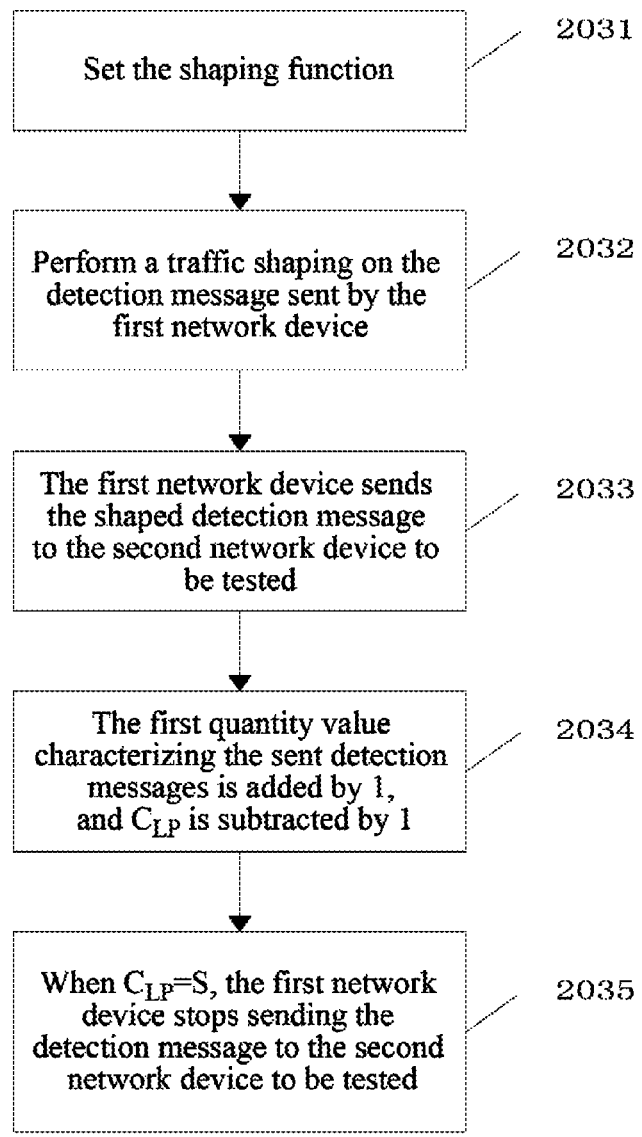
FIG. 5 is a flow chart of the first network device sending the detection message to the second network device to be tested in accordance with an embodiment of the present invention.

In the implementation process, the implementation process of the step 203 is shown in FIG. 5 and comprises the following steps.

In 2031, it is to set the shaping function.
In 2032, it is to send the detection message sent by the first network device 20 to a shaping function module for performing traffic shaping.
In step 2033, the first network device 10 sends the shaped detection message to the second network device 30 to be tested.
In step 2034, the first quantity value S characterizing the sent detection messages is added by 1, and the $C_{LP}$ is subtracted by 1.
In 2035, when $C_{LP}=S$, the first network device 10 stops sending the detection message to the second network device 30 to be tested.

After sending the detection message to the second network device 30 to be tested in the step 203, the method in the embodiment of the present invention proceeds to step 204.

In step 204, it is to receive a loopback detection message looped back by the second network device 30.

In the implementation process, the loopback detection message can be: a message sent via the sending/receiving port of the second network device 30 to the first network device 10 after the second network device 30 receives and processes the detection message.

In the implementation process, the step 204 comprises:

processing the received loopback detection message; detecting whether the loopback detection message is a valid message or not; if the loopback detection message is a valid message, the second quantity value R characterizing the loopback detection messages added by 1.

In the implementation process, when processing the loopback detection message, the network protocol used is a network protocol corresponding to the loopback detection message.

The implementation process of the step 204 comprises: the first network device 10 receiving a loopback detection message; sending the loopback detection message to the first network protocol for processing to test whether the loopback detection message is a valid message or not; when the loopback detection message is a valid message, the R added by 1.

The second network device 30 obtains the loopback detection message with the following steps:

the second network device 30 receives a detection message sent by the first network device 10;

the second network device 30 sends the detection message to the second network protocol for processing, to generate a loopback detection message.

After receiving the loopback detection message in step 204, the method in the embodiment of the present invention proceeds to step 205.

In step 205, it is to obtain a first quantity value of the detection messages, as well as a second quantity value of the loopback detection messages.

In the implementation process, the obtained first quantity value and second quantity value are directly displayed by the first setting unit 1041 and second setting unit 1042 in the initialization setting unit 104.

In the implementation process, when obtaining the first quantity value S of the detection messages as well as the second quantity value R of the loopback detection messages in step 205, the counting process is not after step 201, step 202, step 203 and step 204, but it has already begun counting in the testing process, that is, at each time when the first network device 10 sends the detection message, the S is added by 1, at each time when the first network device 10 receives the loopback detection message looped back by the second network device 30 to be tested, the R is added by 1.

After step 205, the embodiment of the present invention proceeds to step 206.

In step 206, it is to obtain the second throughput value characterizing the throughput of the second network device 30 through the data processor 103 based on the first quantity value and the second quantity value.

The step 206 comprises: when the counting time of the timer $T_{CPU}$ in the first network device 10 is greater than or equal to the preset time $T_s$, the current test ends, comparing the first quantity value with the second quantity value to obtain a comparison result.

When the comparison result shows that the first quantity value is equal to the second quantity value, it is to determine the test throughput value obtained when the first quantity value is equal to the second quantity value as the second throughput value, wherein the second throughput value is the second network device 30's real throughput value.

In the implementation process, the implementation process of step 206 comprises: when the timer $T_{CPU}$ in the first network device 10 exceeds the preset time $T_s$, the test process ends; the data processor 103 in the first network device 10 compares the value of S with the value of R and uses the dichotomy approximation method to determine the throughput value of the second network device 30 to be tested.

In the implementation process, the analysis process of the first network device 10 determining the throughput value of the second network device 30 to be tested is described as follows:

(A) if S>R, it indicates that there is frame loss in this test process, and it needs to decrease the throughput value $TP_%$ in this test according to the dichotomy approximation method, and then it starts the next test from step 201;

(B) if S=R, it indicates that there is no frame loss in this test process, if the throughput value $TP_%$ in this test is 100%, then testing stops, and if $TP_%$ is not 100%, then the $TP_%$ is increased according to the dichotomy approximation method, and then it starts the next test from step 201; and the test is repeated and repeated to obtain a sufficiently accurate value approximating the actual throughput value of the second network device 30 to be tested.

Through the method in the embodiment of the present invention, in the case without the aid of a professional tester, by using a network device with built-in data processing function to simulate a professional tester and cooperating with the network protocol, the throughput test of a network device is implemented.

The embodiment of the present invention further provides a network device having the data processing function as the first network device 10.

As shown in FIG. 1, in the embodiment of the present invention, the first network device 10 comprises:

a sending/receiving port 101, configured to: send a detection message generated by the first network device 10 and receive a loopback detection message looped back by the second network device 30 to be tested;

a template message creation module 102, configured to: create a template message; and a data processor 103, connected to the sending/receiving port 101.

the data processor 103 is configured to: generate a periodic detection message based on the template message; send the detection message to the second network device 30 to be tested through the sending/receiving port 101; receive a loopback detection message looped back by the second network device 30 through the sending/receiving port 101, and obtain a first quantity value of the detection messages, as well as a second quantity value of the loopback detection messages; and obtain the second throughput value characterizing the throughput of the second network device 30 through the data processor 103 based on the first quantity value and the second quantity value.

In the implementation process, the template message creation module 102 can be implemented in a way of software, such as using language such as JAVA, C++ to write the template message program; or in a way of hardware, such as a built-in template message unit.

In the implementation process, the data processor 103 may be a network processor or a switch chip, and the applicants do not limit the types of the data processor, and all the data processors having the data processing function should be included in the range of data processor of the present document.

In the implementation process, the data processor 103 comprises:

a detection message generation unit 1031, configured to generate a periodic detection message through the data processor 103 in the first network device 10 based on the template message;

a shaping unit 1032, configured to: use the data processor 103 to shape the detection message.

In the implementation process, the shaping unit 1032 can be a traffic shaping unit configured on a dedicated loopback interface of the data processor 103 in the first network device 10.

In the implementation process, the detection message generation unit 1031 comprises:

an interrupt detection unit 10311, configured to: detect whether there is an interrupt event occurring or not;

a generation unit 10312, configured to: when there is an interrupt event occurring, generate the periodic detection message through the data processor 103 based on the template message; wherein the interrupt rate value of the interrupt event occurring is greater than or equal to the second throughput value of the second network device 30.

In the implementation process, the data processor 103 further comprises:

a comparison unit 1033, configured to: when the counting time of the timer in the first network device 10 is greater than is equal to preset time, compare the first quantity value with the second quantity value to obtain a comparison result;

a determination unit 1034, configured to: when the comparison result shows that the first quantity value is equal to the second quantity value, determine the test throughput value obtained when the first quantity value is equal to the second quantity value as the second throughput value, wherein the second throughput value is the second network device's real throughput value.

In the implementation process, the first network device 10 further comprises an initialization setting unit 104, configured to: perform an initialization setting on system resources of the first network device 10.

The initialization setting unit 104 comprises:

a first setting unit 1041, configured to: set S to 0, wherein the S is the first quantity value characterizing the detection messages;

a second setting unit 1042, configured to: set R to 0, wherein the R is the second quantity value characterizing the loopback detection messages;

a third setting unit 1043, configured to: set $C_{LP}$ to C, wherein the value of C is obtained based on the formula $B_{bps} \times TP_\% / (L_f + L_c) \times T_s$, wherein C is an integer greater than or equal to 1, $B_{bps}$ characterizes the theoretical broadband of the second network device 30, $TP_\%$ characterizes the percentage of the throughput of the second network device, $L_f + L_c$ characterizes the actual transmission value of data frames, and $C_{LP}$ is a third quantity value characterizing the remaining detection messages needing to be sent in this test process; and a fourth setting unit 1044, configured to: set the timer $T_{CPU}$ to $T_s$ seconds, wherein the timer $T_{CPU}$ is configured to control the data processor 103 to generate a periodic detection message.

Through one or more technical schemes in the embodiment of the present invention, at least the following technical effects can be achieved:

(1) since the technical means of using a network device to simulate a professional tester is used, it solves the technical problem that the throughput test cannot be carried out in the absence of a test instrument or the test instrument cannot work, and it further has the technical effect of using the network device to automatically test the throughput.

(2) At the same time, it solves the problem that an extra professional test instrument is needed, and further has the technical effect of reducing the costs of throughput test.

Those ordinarily skilled in the art can understand that all or some of steps of the abovementioned method may be completed by the programs instructing the relevant hardware, and the abovementioned programs may be stored in a computer-readable storage medium, such as read only memory, magnetic or optical disk. Alternatively, all or some of the steps of the abovementioned embodiments may also be implemented by using one or more integrated circuits. Accordingly, each module/unit in the abovementioned embodiments may be realized in a form of hardware, or in a form of software function modules. The present document is not limited to any specific form of hardware and software combinations.

Obviously, a person skilled in the art can make various changes and modifications according to the embodiment of the present invention without departing from the spirit and scope of the present document. Therefore, provided that these changes and modifications of the embodiment of the present invention belong to the scope of the claims of the present document or their equivalents, the present document also intends to include these changes and modifications.

INDUSTRIAL APPLICABILITY

In the embodiment of the present invention, since the technical means of using a network device to simulate a professional tester is used, it solves the technical problem that the throughput test cannot be carried out in the absence of a test instrument or the test instrument cannot work, and it further has the technical effect of using the network device to automatically test the throughput; it further solves the problem that an extra professional test instrument is needed, and further has the technical effect of reducing the costs of throughput test.

What is claimed is:

1. A throughput test method, comprising:
creating, by a first network device, a template message;
setting an interrupt event to occur at the data processor of the first network device at a specific rate;
detecting, by the first network device, when an interrupt event occurs at the data processor of the first network device;
everytime the first network device detects an interrupt event occurring, the first network device generating a detection message for each interrupt event based on the template message;
the first network device sending the detection message for each interrupt event to a second network device to be tested, wherein a first throughput value of the first network device is greater than or equal to a second throughput value of the second network device;
the first network device receiving a loopback detection message looped back by the second network device;

the first network device obtaining a first quantity value of the detection messages, as well as a second quantity value of the loopback detection messages; and the first network device obtaining the second throughput value characterizing a throughput of the second network device through the data processor based on the first quantity value and the second quantity value; wherein the specific rate of the interrupt event occurring is greater than or equal to the second throughput value characterizing the throughput of the second network device;

wherein the method only use the network devices being tested for the throughput test and do not use a separate test instrument;

wherein before the step of the first network device generating the detection message through the data processor, the method further comprises:

performing an initialization setting on system resources of the first network device;

wherein the step of performing an initialization setting on system resources of the first network device comprises:

setting S to 0, wherein the S is a first quantity value characterizing the detection messages;

setting R to 0, wherein the R is a second quantity value characterizing the loopback detection messages;

setting $C_{LP}$ to C, wherein the value of C is obtained based on a formula $B_{bps} \times TP_\% / (L_f + L_c) \times T_s$, wherein $B_{bps}$ characterizes a theoretical broadband of the second network device, $TP_\%$ characterizes a percentage of the throughput of the second network device, $L_f + L_c$ characterizes an actual transmission value of data frames, and $C_{LP}$ is a third quantity value characterizing remaining detection messages needing to be sent in this test process; and setting a period time $T_{CPU}$ of a timer to $T_s$ seconds, wherein $T_{CPU}$ represents a period time of the timer, $T_s$ represents a particular time, and the timer is configured to control the data processor to generate the detection message.

2. The method of claim 1, wherein a first network protocol supported by the first network device and a second network protocol supported by the second network device are the same network protocol.

3. The method of claim 1, wherein the step of the first network device generating the detection message through the data processor and sending the detection message to the second network device to be tested comprises:

perform a traffic shaping on the detection message through the data processor, so as to make the first network device send the detection message at a constant rate when a network is congested; and sending the traffic-shaped detection message to the second network device to be tested.

4. The method of claim 1, wherein the step of sending the traffic-shaped detection message to the second network device to be tested comprises:

the first network device sending C detection messages to the second network device, wherein C is an integer greater than or equal to 1, and $C_{LP}=C$;

after each time when the detection message is sent, the first quantity value S characterizing the detection messages added by 1; when S=C, stopping sending the detection message.

5. The method of claim 1, wherein the loopback detection message is:

a message sent via a sending/receiving port of the second network device to the first network device after the second network device receives and processes the detection message.

6. The method of claim 1, wherein after the step of the first network device receiving a loopback detection message looped back by the second network device, the method further comprises:

processing the loopback detection message, to judge validity of the loopback detection message; and when the loopback detection message is valid, the second quantity value R characterizing the loopback detection messages added by 1.

7. The method of claim 1, wherein the step of the first network device obtaining the second throughput value characterizing the throughput of the second network device through the data processor based on the first quantity value and the second quantity value comprises:

when counting time of a timer in the first network device is greater than is equal to preset time, comparing the first quantity value with the second quantity value to obtain one comparison result;

when the comparison result shows that the first quantity value is equal to the second quantity value, determining a test throughput value obtained when the first quantity value is equal to the second quantity value as the second throughput value, wherein the second throughput value is the second network device's real throughput value.

8. The method of claim 3, wherein the step of sending the traffic-shaped detection message to the second network device to be tested comprises:

the first network device sending C detection messages to the second network device, wherein C is an integer greater than or equal to 1, and $C_{LP}=C$;

after each time when the detection message is sent, the first quantity value S characterizing the detection messages added by 1; when S=C, stopping sending the detection message.

9. The method of claim 1, wherein after the step of the first network device receiving a loopback detection message looped back by the second network device, the method further comprises:

processing the loopback detection message, to judge validity of the loopback detection message; and when the loopback detection message is valid, the second quantity value R characterizing the loopback detection messages added by 1.

10. A network device, comprising: a sending/receiving port, a template message creation module and a data processor connected to the sending/receiving port, wherein the template message creation module is configured to: create a template message; the network device sets an interrupt event to occur at the data processor of the network device at a specific rate;

the data processor of the network device is configured to detect when an interrupt event occurring at the data processor of the network device, and generate, based on the template message, a detection message for each interrupt event everytime the network device detects an interrupt event occurring; the data processor of the network device is further configured to: send the detection message for each interrupt event to a second network device to be tested through the sending/receiving port, wherein a first throughput value of the network device is greater than or equal to a second throughput value of the second network device; receive a loopback detection message looped back by the second network device through the sending/receiving port, and obtain a first quantity value of the detection messages, as well as a second quantity value of the loopback detection messages; and obtain the second throughput value characterizing a throughput of the second network device through the data processor based on the first quantity value and the second quantity value; wherein the specific rate of the interrupt event occurring is greater than or equal to the second throughput value characterizing the throughput of the second network device;

wherein the network device further comprises:

an initialization setting unit, configured to: perform an initialization setting on system resources of the network device;

wherein the initialization setting unit comprises:

a first setting unit, configured to: set S to 0, wherein the S is a first quantity value characterizing the detection messages;

a second setting unit, configured to: set R to 0, wherein the R is a second quantity value characterizing the loopback detection messages;

a third setting unit, configured to: set $C_{LP}$ to C, wherein the value of C is obtained based on a formula $B_{bps} \times TP_{\%}/(L_f + L_c) \times T_s$, wherein C is an integer greater than or equal to 1, $B_{bps}$ characterizes a theoretical broadband of the second network device, $TP_{\%}$ characterizes a percentage of the throughput of the second network device, $L_f + L_c$ characterizes an actual transmission value of data frames, and $C_{LP}$ is a third quantity value characterizing remaining detection messages needing to be sent in this test process; and a fourth setting unit, configured to: set a period time $T_{CPU}$ of a timer to $T_s$ seconds, wherein $T_{CPU}$ represents a period time of the timer, $T_s$ represents a particular time, and the timer is configured to control the data processor to generate the detection message.

11. The network device of claim 10, wherein a first network protocol supported by the network device and a second network protocol supported by the second network device are the same network protocol.

12. The network device of claim 10, wherein the data processor comprises:

a detection message generation unit, configured to generate the detection message through the data processor based on the template message;

a shaping unit, configured to: perform traffic shaping on the detection message through the data processor.

13. The network device of claim 10, wherein the data processor further comprises:

a comparison unit, configured to: when counting time of a timer in the network device is greater than or equal to preset time, compare the first quantity value with the second quantity value to obtain one comparison result;

a determination unit, configured to: when the comparison result shows that the first quantity value is equal to the second quantity value, determine a test throughput value obtained when the first quantity value is equal to the second quantity value as the second throughput value, wherein the second throughput value is the second network device's real throughput value.

* * * * *